United States Patent
Yi et al.

(10) Patent No.: US 10,278,090 B2
(45) Date of Patent: Apr. 30, 2019

(54) METHOD AND APPARATUS FOR HANDLING USER EQUIPMENT MEASUREMENTS IN CASE OF ABSENCE OF DISCOVERY SIGNALS IN WIRELESS COMMUNICATION SYSTEM

(71) Applicant: LG ELECTRONICS INC., Seoul (KR)

(72) Inventors: Yunjung Yi, Seoul (KR); Hanbyul Seo, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/521,836

(22) PCT Filed: Oct. 30, 2015

(86) PCT No.: PCT/KR2015/011592
§ 371 (c)(1),
(2) Date: Apr. 25, 2017

(87) PCT Pub. No.: WO2016/068653
PCT Pub. Date: May 6, 2016

(65) Prior Publication Data
US 2017/0245168 A1 Aug. 24, 2017

Related U.S. Application Data

(60) Provisional application No. 62/073,000, filed on Oct. 30, 2014.

(51) Int. Cl.
*H04W 24/10* (2009.01)
*H04W 24/00* (2009.01)
(Continued)

(52) U.S. Cl.
CPC .......... *H04W 24/10* (2013.01); *H04W 8/005* (2013.01); *H04W 16/14* (2013.01); *H04W 24/00* (2013.01);
(Continued)

(58) Field of Classification Search
CPC . H04W 16/14; H04W 52/242; H04W 52/244; H04W 52/40; H04W 52/50;
(Continued)

(56) References Cited

U.S. PATENT DOCUMENTS

2012/0129522 A1 5/2012 Kim et al.
2012/0213109 A1 8/2012 Xu et al.
(Continued)

OTHER PUBLICATIONS

PCT International Application No. PCT/KR2015/011592, Written Opinion of the International Searching Authority dated Feb. 5, 2016, 2 pages.

*Primary Examiner* — Mohamed A Kamara
(74) *Attorney, Agent, or Firm* — Lee, Hong, Degerman, Kang & Waimey

(57) ABSTRACT

A method and apparatus for performing measurements on an unlicensed carrier in a wireless communication system is provided. A user equipment (UE) receives a first unlicensed discovery reference signal (U-DRS) from a serving cell in the unlicensed carrier, performs measurement for the serving cell based on the first U-DRS, detects that reception of a second U-DRS from the serving cell is not successful, and reports a result of the measurement based on the first U-DRS.

20 Claims, 7 Drawing Sheets

(51) Int. Cl.
*H04W 8/00* (2009.01)
*H04W 16/14* (2009.01)
*H04W 24/08* (2009.01)
*H04W 36/00* (2009.01)
*H04W 48/16* (2009.01)

(52) U.S. Cl.
CPC ........ *H04W 24/08* (2013.01); *H04W 36/0083* (2013.01); *H04W 48/16* (2013.01)

(58) Field of Classification Search
CPC ......... H04W 72/0426; H04W 72/0453; H04W 72/082; H04W 72/085; H04W 72/1215; H04W 84/045; H04W 88/06; H04W 24/08; H04W 24/10; H04L 5/001; H04L 5/0048; H04L 5/0053
See application file for complete search history.

(56) References Cited

U.S. PATENT DOCUMENTS

| | | |
|---|---|---|
| 2013/0336156 A1 | 12/2013 | Wei et al. |
| 2014/0023022 A1 | 1/2014 | Cheng et al. |
| 2014/0036881 A1 | 2/2014 | Kim et al. |
| 2015/0146680 A1* | 5/2015 | Luo ........................ H04L 5/0035 370/330 |
| 2016/0157258 A1* | 6/2016 | Saiwai ................... H04W 16/28 370/329 |
| 2017/0135039 A1* | 5/2017 | Takeda .................. H04W 16/32 |
| 2017/0251373 A1* | 8/2017 | Ding ..................... H04W 16/14 |
| 2017/0265172 A1* | 9/2017 | Futaki ................... H04W 16/14 |

\* cited by examiner

METHOD AND APPARATUS FOR HANDLING USER EQUIPMENT MEASUREMENTS IN CASE OF ABSENCE OF DISCOVERY SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2015/011592, filed on Oct. 30, 2015, which claims the benefit of U.S. Provisional Application No. 62/073,000, filed on Oct. 30, 2014, the contents of which are all hereby incorporated by reference herein in its entirety.

BACKGROUND OF THE INVENTION

Field of the Invention

The present invention relates to wireless communications, and more particularly, to a method and apparatus for handling user equipment (UE) measurements in case of absence of discovery signals in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities.

Further, as the demands on data rate keeps increasing, the utilization/exploration on new spectrum and/or higher data rate is essential. As one of a promising candidate, utilizing unlicensed spectrum, such as 5 GHz unlicensed national information infrastructure (U-NII) radio band, is being considered. As it is unlicensed, to be successful, necessary channel acquisition and completion/collision handling and avoidance are expected. As LTE is designed based on the assumption that a UE can expect DL signals from the network at any given moment (i.e., exclusive use), LTE protocol needs to be tailored to be used in non-exclusive manner. In terms of non-exclusive manner, overall two approaches may be considered. One is to allocate time in a semi-static or static manner (for example, during day time, exclusive use, and during night time, not used by LTE), and the other is to compete dynamically for acquiring the channel. The reason for the completion is to handle other radio access technology (RAT) devices/networks and also other operator's LTE devices/networks.

For purpose of measurements, various types of signals may be transmitted in an unlicensed carrier. However, reliable transmission of signals in the unlicensed carrier may not be guaranteed. Consequently, some signals for measurements may be missed. Accordingly, a method for handling measurements in case of absence of discovery signals may be required.

SUMMARY OF THE INVENTION

The present invention provides a method and apparatus for handling user equipment (UE) measurements in case of absence of discovery signals in a wireless communication system. The present invention provides a method and apparatus for handling UE measurement/synchronization aspects when discovery signals, e.g. discovery reference signal (DRS), are not transmitted due to some reasons, e.g. channel busy. The present invention provides a method and apparatus for reporting a result of measurement based on previous received discovery signals or indicating higher layer about the unsuccessful detection of DRS, when discovery signals are not received successfully in an unlicensed carrier.

In an aspect, a method for performing, by a user equipment (UE), measurements on an unlicensed carrier in a wireless communication system is provided. The method includes receiving a first unlicensed discovery reference signal (U-DRS) from a serving cell in the unlicensed carrier, performing measurement for the serving cell based on the first U-DRS, detecting that reception of a second U-DRS from the serving cell is not successful, and reporting a result of the measurement based on the first U-DRS.

In another aspect, a user equipment (UE) is provided. The UE includes a memory, a transceiver, and a processor coupled to the memory and the transceiver, and configured to control the transceiver to receive a first unlicensed discovery reference signal (U-DRS) from a serving cell in the unlicensed carrier, perform measurement for the serving cell based on the first U-DRS, detect that reception of a second U-DRS from the serving cell is not successful, and control the transceiver to report a result of the measurement based on the first U-DRS.

When discovery signals in an unlicensed carrier are not received successfully, measurement can be performed efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
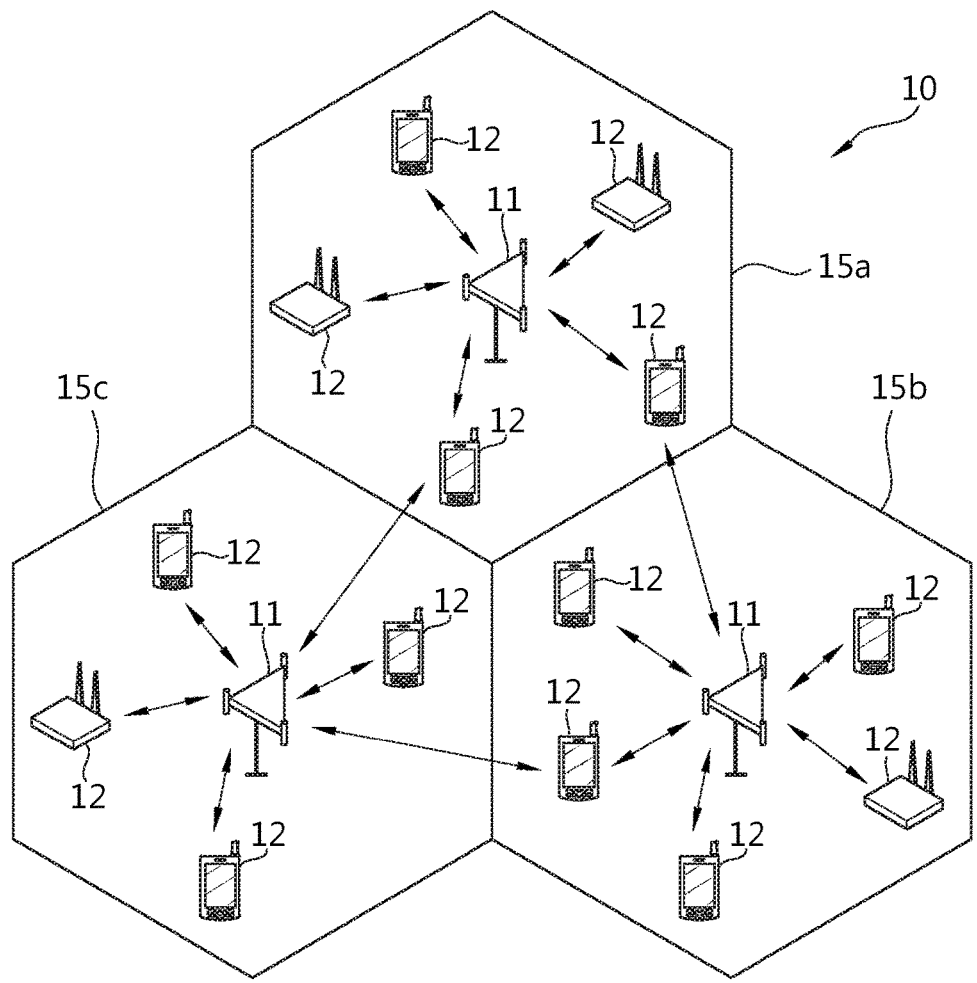
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
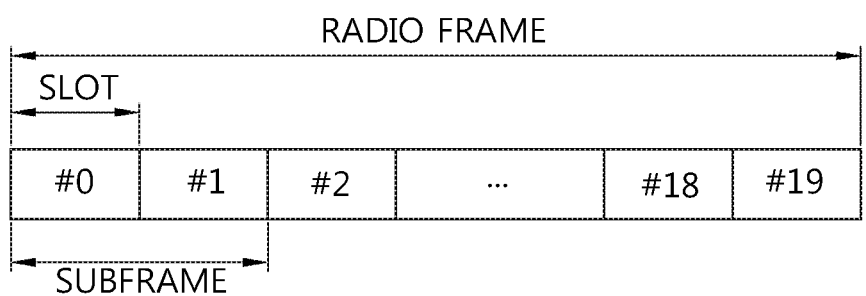
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
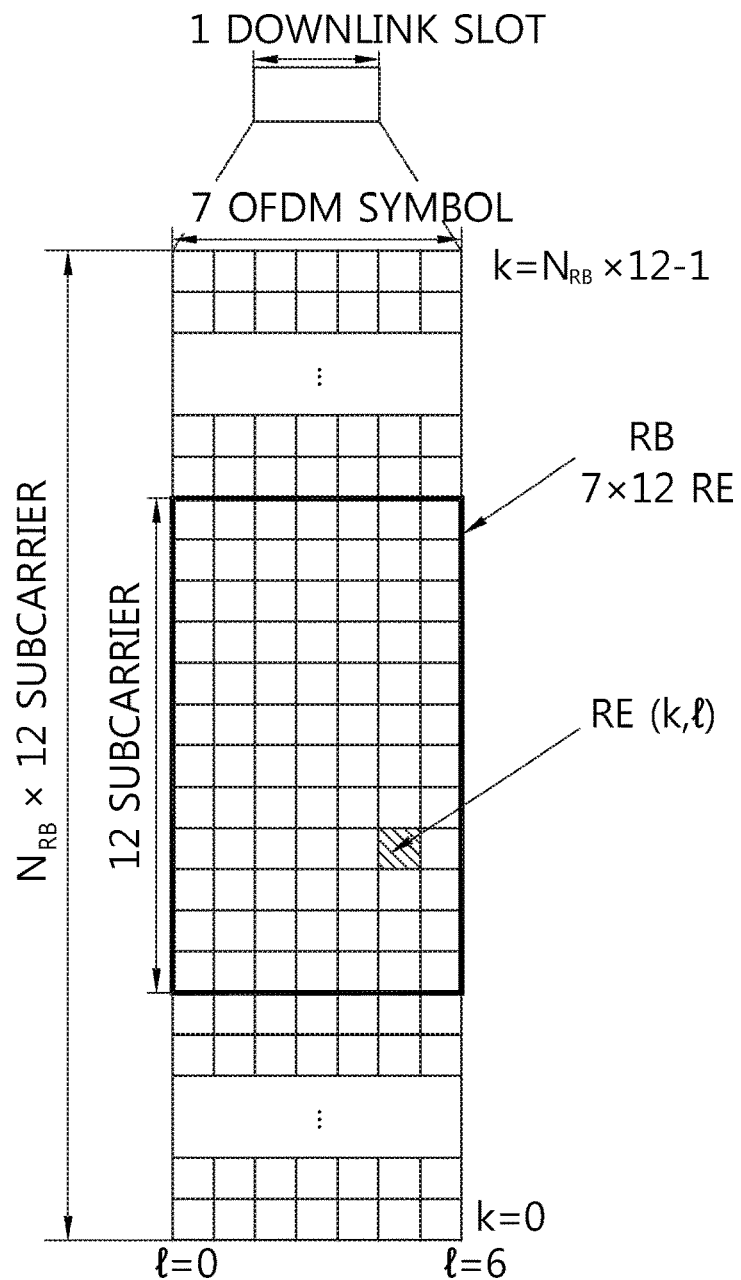
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
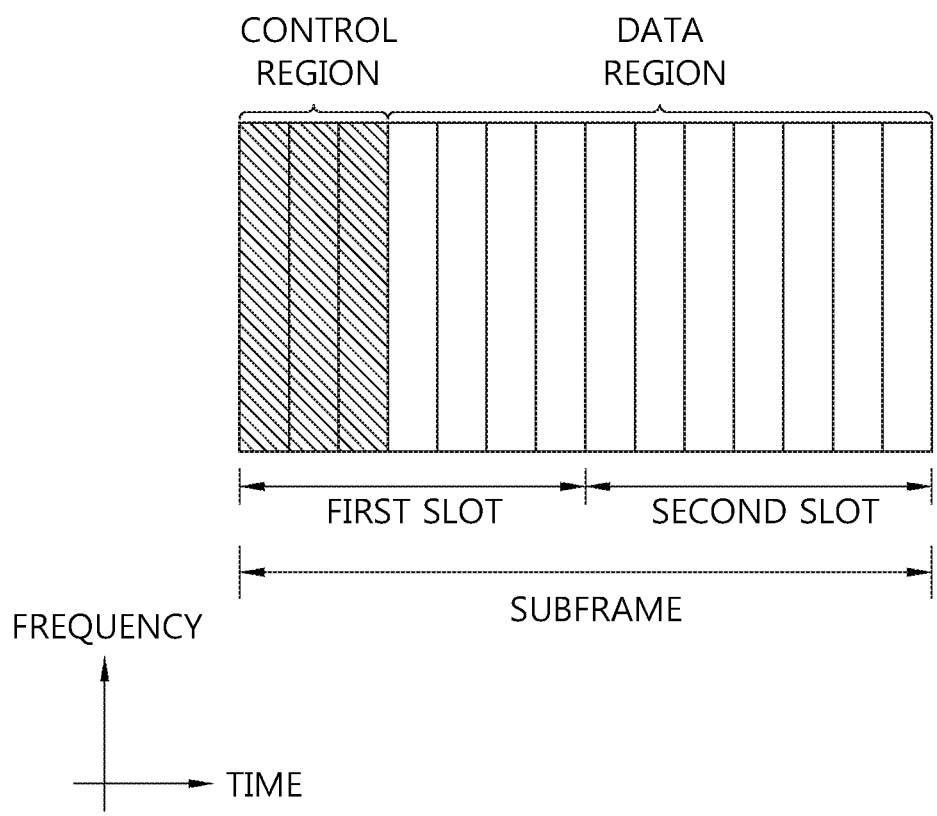
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
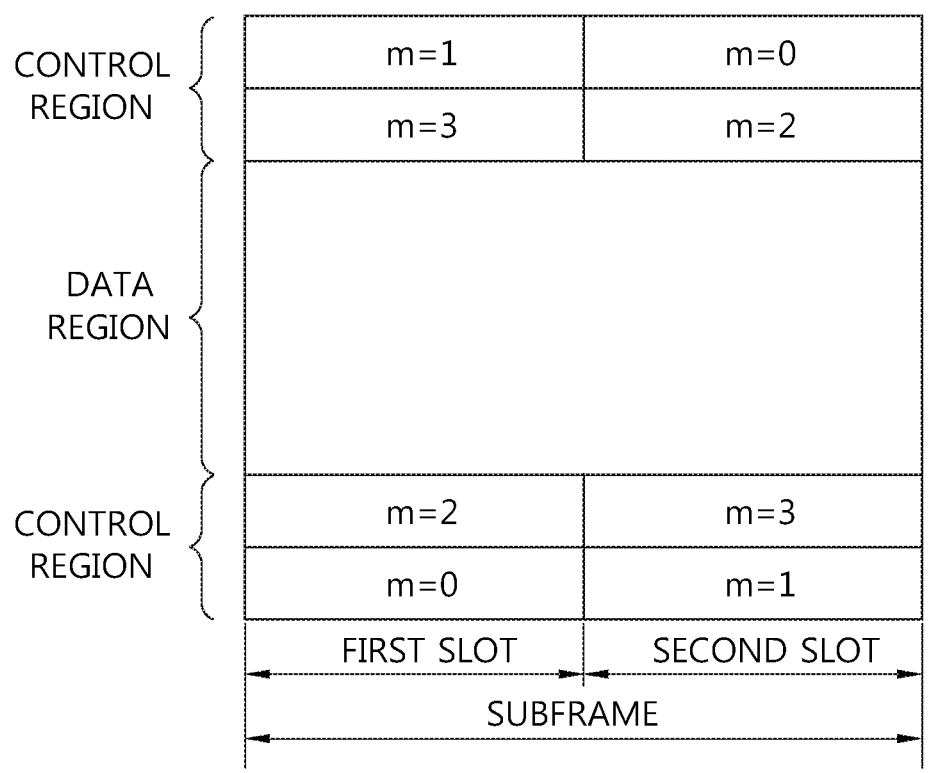
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In unlicensed spectrum (or, unlicensed band) where LTE devices may coexist with other radio access technology (RAT) devices such as Wi-Fi, Bluetooth, etc., it is necessary to allow a UE behavior adapting various scenarios. In LTE in unlicensed spectrum (LTE-U), various aspects for 3GPP LTE described above may not be applied for LTE-U. For example, the TTI described above may not be used for LTE-U carrier where variable or floating TTI may be used depending on the schedule and/or carrier sensing results. For another example, in LTE-U carrier, rather than utilizing a fixed DL/UL configuration, dynamic DL/UL configuration based on scheduling may be used. However, due to UE characteristics, either DL or UL transmission may occur at time. For another example, different number of subcarriers may also be utilized for LTE-U carrier.

By the nature of unlicensed band, it is expected that each device using the unlicensed band should apply a type of polite access mechanism not to monopolize the medium and not to interfere on-going transmission. As a basic rule of coexistence between LTE-U devices and Wi-Fi devices, it may be assumed that on-going transmission should not be interrupted or should be protected by proper carrier sensing mechanism. In other words, if the medium is detected as busy, the potential transmitter should wait until the medium becomes idle. The definition of idle may depend on the threshold of carrier sensing range.

To be able to efficient support UE cell association and inter-cell interference, etc., it is expected that a UE needs to perform measurements on both serving cells and neighbour cells in both intra and inter-frequency. Due to its nature of unlicensed medium which should be shared by multiple users, it may become a bit challenging to assume consistently periodic transmission of any type of signals. Furthermore, it may also not be easily possible to assume that signals will be transmitted with certain probability or the frequency of signal transmission is maintained as a certain value. Typically, measurement in LTE is based on periodic transmission of measurement/synchronization signals such as primary synchronization signal (PSS)/secondary synchronization signal (SSS) and cell-specific reference signal (CRS). Given the challenges of unlicensed band to transmit periodic signals, some modification of UE measurement in unlicensed band may be necessary.

To support various types of measurements, it may be assumed that a type of discovery signal is transmitted in unlicensed band as well. For the convenience, the discovery signal transmitted in the unlicensed band may be called an unlicensed discovery reference signal (U-DRS). In terms of transmission/reception assumption on U-DRS, the following may be considered.

(1) Alt 1: The U-DRS may be transmitted periodically where the quality of the U-DRS may vary due to interference. Regardless of the mechanisms how to guarantee this, if the UE assumes periodic transmission of the U-DRS, similar measurement procedure as in LTE may be applied for unlicensed band.

(2) Alt 2: If transmitted, the U-DRS may be transmitted periodically. However, it is possible that the U-DRS may be omitted due to channel busy, and so on. In this case, some handling of UE measurement/blind detection as well as system assistance may be necessary.

(3) Alt 3: If transmitted, the U-DRS may be transmitted periodically with a certain search window. For example, the U-DRS may be transmitted roughly periodicity of 40 ms with ±5 ms of search window. If listen-before-talk (LBT) was not successful during this search window, the network may not transmit or the UE may not search the U-DRS. This means that the U-DRS, if transmitted, will be transmitted with periodicity of 40 ms with 10 ms of search window where the U-DRS can be transmitted in anywhere in that search window. Furthermore, in the next period, the transmission timing may be different from the current transmission timing. For example, the U-DRS may be transmitted in subframe #0 (or in the first offset) in the first occasion, then may be transmitted in subframe #1 (or in the second offset) in the second occasion, and so on. Thus, a UE cannot assume the exact timing where the U-DRS is transmitted. In such a case, it becomes more challenging to assume aggregated/average measurement over multiple occasions. Thus, it is also possible that a UE performs measurement based on a single instance. To locate the exact location of the U-DRS transmission, a few mechanisms may be further considered.

Based on UE blind detection, the first subframe of the U-DRS occasion may carry a known sequence. For example, the first subframe of the U-DRS occasion may start with SSS (or SSS-like synchronization signal) transmission.

Network indication via DCI by licensed carrier (accompanied) may be configured.

(4) Alt 4: The U-DRS may be transmitted anytime. A measurement requirement may be defined as the number of potentially receivable U-DRS occasions.

Meanwhile, regardless of approach used for transmission of the U-DRS described above, due to the nature of interference and LBT, a UE may experience failure of U-DRS detection. In terms of determining the threshold for determining failure or success of the U-DRS detection, a UE may determine the threshold and inform the threshold of detection to the higher layer or to the network, or alternatively, a higher layer or the network may configure the threshold. Depending on the mechanism, in terms of reporting, the content may be different. For example, the network may configure more than one threshold values where the UE may report multiple results per each threshold. Also, it is possible to have different threshold between the serving cell and the neighbor cell(s) and between intra-frequency cells and inter-frequency cells.

For one embodiment, as described above in Alt 2, the U-DRS may be transmitted periodically, but the U-DRS may also be omitted due to, e.g. channel busy. In this case, a method for handling of missing the U-DRS may be proposed according to an embodiment of the present invention. To discuss the handling of missing of the U-DRS, handling on the U-DRS for serving cell and neighbor cell may be described separately. It may be assumed that a UE is able to detect whether the U-DRS has been transmitted or not based on a threshold (such as signal to interference and noise ratio (SINR)) or correlation detection. Further, a UE may not assume that the U-DRS will be transmitted except for periodic DRS based on configuration such as measurement timing configuration. In other words, a UE may not expect that the cell will transmit measurement signals continuously other than timing where the network configures that a UE can perform measurement for a specific cell or frequency. However, when data transmission occurs for a UE, the UE may assume that additional U-DRS may be transmitted with data transmission. Whether to utilize such additional U-DRS or not for the measurement may be up to UE implementation or configured by higher layer.

First, a method for handling of missing the U-DRS for a serving cell is described according to an embodiment of the present invention. Assuming that a UE needs to perform measurement on the serving cell continuously, periodic transmission of the U-DRS from the serving cell is important. However, additional measurement signals from the serving cell along with potentially data transmission may be also considered. Hereinafter, the serving cell refers an activated serving cell. Deactivated serving cell may be treated same as to the neighbor cell.

In perspective of measurement, if a UE needs to perform measurement for the serving cell, and if this is the first time of not successful detection of the U-DRS from the serving cell, previous detection of the U-DRS may be used for the measurement. In other words, measurement update may not be performed. To support L1/L3 filter, the same result may be reported to the higher layer. If this is not the first time of not successful detection of the U-DRS from the serving cell, the result of detection (the result may be very low number such as very low SINR value (e.g. −150 dBm) as the measurement RS has not been detected) may be reflected in the measurement results. More specifically, the low value may be used for reference signal received power (RSRP), and if the measurement is actually performed, measurement may be still performed on reference signal strength indicator (RSSI). In other words, for RSRP, the detected value (low value as the signal has not been detected) may be used, and RSSI may be measured. If this continues, handover/deactivation of the unlicensed carrier may be triggered. When a UE receives the U-DRS from the serving cell successfully, the UE may reset the counter on "UNSUCCESSFUL_U_DRS" from the serving cell.

Further, if the U-DRS from the serving cell has not been successfully received, a UE may indicate to the network or higher layer, e.g. primary cell (PCell) or licensed carrier. In terms of indication mechanisms, at least one of the followings may be considered.

(1) Explicit ACK-NACK resource may be reserved to transmit feedback for the U-DRS from the serving cell for each UE. Each UE may transmit ACK or NACK in every U-DRS occasion whether the U-DRS has been received successfully or not. As a UE may not need to read every U-DRS occasion for the measurement, instead of transmitting ACK or NACK every time, the UE may transmit NACK only if it does not detect the U-DRS when it attempts to read the U-DRS. Upon receiving NACK, following data transmission procedure (such as LBT), the network may retransmit the U-DRS. This indication may be transmitted to only L3 filter (higher layer) within a UE such that L3 filter may be adapted accordingly (to reflect missing/undetected U-DRS). In other words, when the UE transmits result, the UE may add information on whether it was successful detection or not along with the measurement.

(2) Higher layer signaling may be transmitted if RSRP becomes lower than a threshold. In this case, no special handling of missing the U-DRS may be needed. Rather, if RSRP becomes lower than a threshold, the UE may indicate that to the PCell.

(3) Periodic report on the status of synchronization may be transmitted. Based on reception of the U-DRS from the serving cell, the UE may report the synchronization status or the average SINR of synchronization signals to the network. In this case, if the synchronization is not accurately maintained or the average SINR of received synchronization signals is lower than a threshold, the UE may report outof-range or signal out-of-sync to the network. If out-of-sync is signaled, the network may transmit additional measurement/synchronization signals to enhance the synchronization. This additional synchronization signal may be transmitted along with data transmission. The timing of additional synchronization signal transmission may be also indicated by the network or a UE may blindly search additional synchronization signals based on the assumption that the network may transmit additional synchronization signals when the UE reports low quality of synchronization status.

In addition to transmitting, by the UE, the indication to the network, the network assistance may be further proposed. That is, the network may also transmit an indication of success or failure after transmitting/dropping the U-DRS. From the PCell, a DCI or PHICH may be periodically transmitted with the same periodicity of the U-DRS transmission to indicate whether the U-DRS has been transmitted or not. In terms of timing, if the U-DRS is scheduled to be transmitted at n-th subframe, the DCI may be transmitted in n+1-th subframe with the same periodicity. If the U-DRS has not been transmitted in one occasion, the network may transmit additional U-DRS attached to the data transmission between U-DRS transmissions. For example, if the U-DRS is not transmitted in SFN=K where periodicity is 40 ms, the network may transmit additional U-DRS along with data transmission between SFN=K to SFN=K+4 (the next instance of the U-DRS). When the network transmits the indication of success or failure of the U-DRS, in terms of handling the missing the U-DRS, the following may be considered.

(1) The previous measurement result may be used and the measurement result may not be updated. Or, the measurement result may be updated by reading additional U-DRS (at least one U-DRS between SFN=K to SFN=K+4 if the U-DRS is missing in SFN=K).

(2) The higher layer may be informed the U-DRS missing such that L1/L3 filter will not be affected by missing of the U-DRS. Timing related to the measurement may not be accounted for if the UE knows that the U-DRS has been missing. If a UE measures additional U-DRS, the UE may inform the higher layer about successful but delayed U-DRS reception.

To support the network assistance based detection of the U-DRS, however, it may be necessary that the UE may buffer measurement RS until the network assistance is received (e.g. one subframe buffering).

A method for handling of missing the U-DRS for a neighbor cell is described according to an embodiment of the present invention. For the neighbor cell, transmitting the indication to the PCell or network assistance may not be easily feasible. Thus, the following procedure may be applied.

In perspective of measurement, if a UE needs to perform measurement for the neighbor cell, and if this is the first time of not successful detection of the U-DRS from the neighbor cell, previous detection of the U-DRS may be used for the measurement. In other words, measurement update may not be performed. To support L1/L3 filter, the same result may be reported to the higher layer. If this is not the first time of not successful detection of the U-DRS from the neighbor cell, the result of detection (the result may be very low number as the measurement RS has not been detected) may be reflected in the measurement results. Alternatively, for the neighbor cell measurement, differentiation between bad quality signal and missing the U-DRS may not be attempted. All cases may be considered as low SINR case. In terms of UE measurement, similar to positional reference signal (PRS) based measurement requirement, when a UE detects the U-DRS from a cell more than a few times within a duration with SINR exceeding a certain threshold, the UE may be able to perform measurement within a certain latency requirement with a certain accuracy requirement. In other words, if a UE does not receive one or more U-DRS successfully, it may not be required to perform measurement on that cell.

Further, if the neighbor cells and serving cell are assumed to be aligned to transmit the U-DRS (i.e. cells are transmitting U-DRS at the same time), if the network transmits an indication of success or failure of the U-DRS from the serving cell, the UE may assume that if the U-DRS from the serving cell has been transmitted, the U-DRS from neighbor cells are also transmitted. Otherwise, it may assume that the U-DRS from neighbor and serving cell are not transmitted. Similar mechanism used for serving cell measurement may be applicable to neighbor cell measurements.

For another embodiment, as described above in Alt 3, the U-DRS may be transmitted periodically with a certain search window. Also in this case, a method for handling of missing the U-DRS may be proposed according to another embodiment of the present invention. Basically, a method for handling of missing the U-DRS for case of Alt 3 may be similar to the method for handling of missing the U-DRS for case of Alt 2 described above. That is, measurement, indication to the PCell and/or network assistance may be applied to the method for handling of missing the U-DRS for case of Alt 3. In addition, the followings may be further considered.

In this case, a UE may detect whether the U-DRS has been transmitted or not for a time duration T (search window). Since each cell may transmit the U-DRS in a different timing in every DRS occasion, the interference may change dynamically. Thus, using this option, either only RSRP or RSSI may be measured over a longer period (e.g. RSSI may be measured over all subframes in each search window where the UE searches the U-DRS). Further, the network may also indicate in which subframe the U-DRS has been transmitted via DCI from accompanied licensed band. In this case, the buffering requirement at UE side may increase as the search window size is large depending on the uncertainty. Further, if the neighbor cells and serving cell are assumed to be aligned to transmit the U-DRS (i.e. cells are transmitting U-DRS at the same time), if the network transmits an indication of success or failure of the U-DRS from the serving cell, the UE may assume that if the U-DRS from the serving cell has been transmitted, the U-DRS from neighbor cells are also transmitted. Otherwise, it may assume that the U-DRS from neighbor and serving cell are not transmitted.

Meanwhile, for case of Alt 3 or Alt 4 described above, performance/requirement issue may occur. For Alt 4, if the U-DRS can be transmitted any time, fixing requirement for measurement latency/accuracy becomes challenging. Thus, from a UE perspective, the requirement may be determined solely based on the number of received U-DRS per each cell. In this case, best-effort requirement may be defined for UE measurement in unlicensed band. In other words, a UE may need to report measurement if the UE has successfully received at least K number of U-DRS from a cell with a certain threshold. Since it is not guaranteed when the U-DRS is transmitted, the measurement latency may be loosely defined.

Further, for case of Alt 3 (and potentially for case of Alt 4), more generally, a UE may be required to perform measurement within a certain latency as long as at least one U-DRS per DRS measurement timing configuration (DMTC) period which is configured by the network. If a UE does not detect at least one DRS in one occasion, the UE may not have to satisfy the requirements. Alternatively, if a UE knows that the U-DRS from a cell is missing due to channel condition or other reasons, the UE may relax the measurement requirement. Or, similar to previous approach, the measurement latency may be defined as a min {number of U-DRS reception, number of required DMTC/DRS occasions} rather than a number of DMTC period or DRS occasion only, since one DMTC or DRS occasion may or may not transmit the U-DRS. When more than K U-DRS out of M DMTC or DRS occasions from a cell has been missing (i.e. a UE has not received any U-DRS within a DMTC interval, e.g. 80 ms, it may be considered as one U-DRS missing/if additional U-DRS is transmitted to mitigate the missed U-DRS in the configured timing, it may be considered as no-missing case), a UE may not be required to report measurement on the cell. In fact, it may be better to omit measurement results on those cells rather than reporting inaccurate results. Alternatively, the UE report the results with the number of successful U-DRS detection. Also, it is possible to report one-shot measurement (measurement based on a single instance of U-DRS) and the average measurement result which is measured over successfully detected U-DRS.

Meanwhile, proposals described above are covering both RSRP and RSRQ/RSSI measurements. In general, unless different timing is used to measure RSSI such as to measure non-LTE system or inter-operator cells, it may be assumed that RSRP and RSSI are measured in the same resource/time. If a separate resource/time is configured for measuring RSSI, a UE may perform RSSI measurement regardless of actual transmission of the U-DRS.

Figure 6:
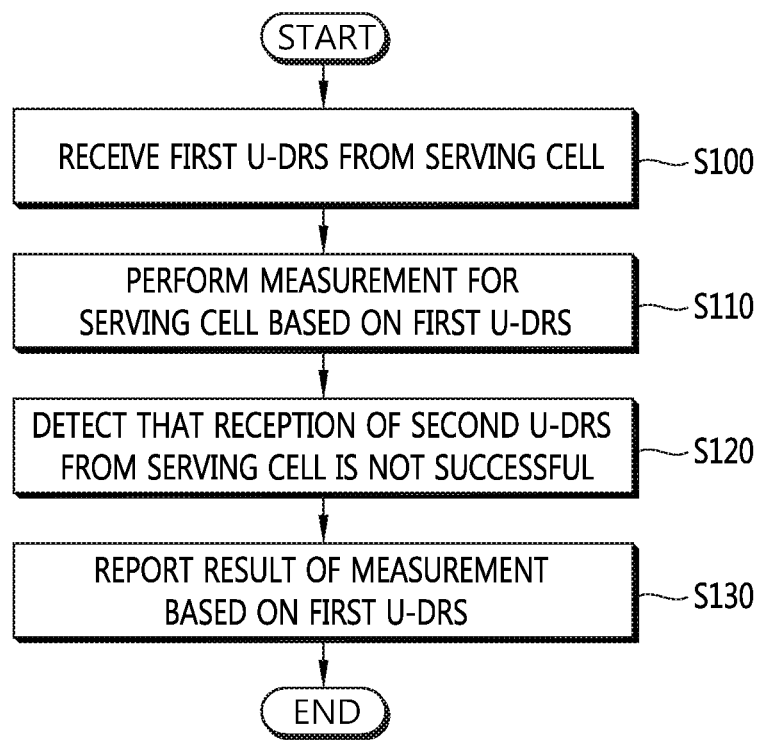
FIG. 6 shows a method for performing measurements on an unlicensed carrier according to an embodiment of the present invention.

FIG. 6 shows a method for performing measurements on an unlicensed carrier according to an embodiment of the present invention.

In step S100, the UE receives a first U-DRS from a serving cell in the unlicensed carrier. In step S110, the UE performs measurement for the serving cell based on the first U-DRS. In step S120, the UE detects that reception of a second U-DRS from the serving cell is not successful. In step S130, the UE reports a result of the measurement based on the first U-DRS. The first U-DRS and the second U-DRS may be transmitted with a specific periodicity. Further, the measurement may be performed in a certain search window. The detection that reception of the second U-DRS is not successful is determined based on a threshold configured by a higher layer or a network. The detection that reception of a second U-DRS from the serving cell is not successful may occur for the first time. The result of the measurement may be reported to a higher layer.

The UE may further transmit a first indication indicating that reception of the second U-DRS from the serving cell is not successful to a higher layer or a PCell or a licensed carrier. The first indication may correspond to an ACK/NACK for reception of the second U-DRS. Or, the first indication may correspond to a higher layer signaling. Or, the first indication may correspond to a periodic report on a status of synchronization.

The UE may further receive a second indication indicating whether the first U-DRS or the second U-DRS has been transmitted or not from the serving cell. The second indication may be received via a DCI or PHICH. Further, the measurement may include either a measurement of a RSRP or a measurement of a RSSI. Further, different timing may be configured for the measurement of a RSSI from the measurement of a RSRP.

Further, the description above according to embodiments of the present invention may be applied to the embodiment described in FIG. 6.

Figure 7:
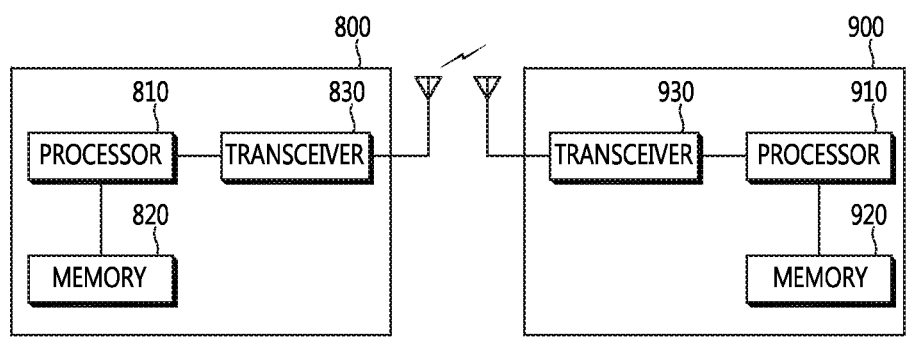
FIG. 7 shows a wireless communication system to implement an embodiment of the present invention.

FIG. 7 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing measurements on an unlicensed carrier in a wireless communication system, the method performed by a user equipment (UE) and comprising:

receiving a first unlicensed discovery reference signal (U-DRS) from a serving cell via the unlicensed carrier;

performing measurement of the serving cell based on the received first U-DRS;

reporting a result of the performed measurement;

determining unsuccessful reception of a second U-DRS from the serving cell after reporting the result of the performed measurement; and reporting the result of the previously performed measurement again if the unsuccessful reception of the second U-DRS has been determined for a first time.

2. The method of claim 1, wherein the first U-DRS and the second U-DRS are received with a specific periodicity.

3. The method of claim 1, wherein the measurement is performed in a specific search window.

4. The method of claim 1, wherein determining the unsuccessful reception of the second U-DRS is based on a threshold configured by a higher layer or a network.

5. The method of claim 1, wherein the result of the performed measurement is reported to a higher layer.

6. The method of claim 1, further comprising transmitting an indication of the unsuccessful reception of the second U-DRS to a higher layer, a primary cell (PCell) or a licensed carrier.

7. The method of claim 6, wherein the indication is a non-acknowledgement for the unsuccessful reception of the second U-DRS.

8. The method of claim 6, wherein the indication is higher layer signaling.

9. The method of claim 6, wherein the indication is a periodic report related to a status of synchronization.

10. The method of claim 1, further comprising receiving an indication from the serving cell indicating whether the first U-DRS or the second U-DRS has been transmitted.

11. The method of claim 10, wherein the indication is received via a downlink control information or a physical HARQ indicator channel.

12. The method of claim 1, wherein the measurement comprises either a measurement of a reference signal received power (RSRP) or a measurement of a received signal strength indicator (RSSI).

13. The method of claim 12, wherein different timing is configured for the measurement of the RSSI from the measurement of the RSRP.

14. A user equipment (UE) performing measurements on an unlicensed carrier in a wireless communication system, the UE comprising:
a memory configured to store information;
a transceiver configured to transmit and receive information; and
a processor coupled to the memory and the transceiver, the processor configured to:
control the transceiver to receive a first unlicensed discovery reference signal (U-DRS) from a serving cell via the unlicensed carrier;
perform measurement of the serving cell based on the received first U-DRS;
control the transceiver to report a result of the performed measurement;
determine unsuccessful reception of a second U-DRS from the serving cell after reporting the result of the performed measurement; and
control the transceiver to report the result of the previously performed measurement again if the unsuccessful reception of the second U-DRS has been determined for a first time.

15. The UE of claim 14, wherein the first U-DRS and the second U-DRS are received with a specific periodicity.

16. The UE of claim 14, wherein the measurement is performed in a specific search window.

17. The UE of claim 14, wherein determining the unsuccessful reception of the second U-DRS is based on a threshold configured by a higher layer or a network.

18. The UE of claim 14, wherein the result of the performed measurement is reported to a higher layer.

19. The UE of claim 14, wherein the processor is further configured to control the transceiver to transmit an indication of the unsuccessful reception of the second U-DRS to a higher layer, a primary cell (PCell) or a licensed carrier.

20. The UE of claim 14, wherein the processor is further configured to control the transceiver to receive an indication from the serving cell indicating whether the first U-DRS or the second U-DRS has been transmitted.

* * * * *